No. 607,107. Patented July 12, 1898.
F. WUEST.
TENON OR BACK SAW.
(Application filed Feb. 28, 1898.)
(No Model.)
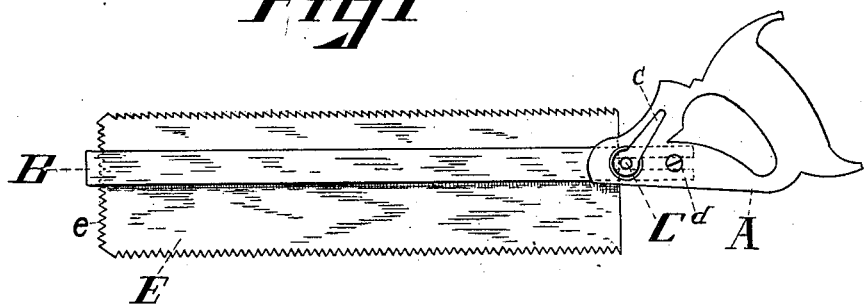
Witnesses
Walter J. Murray
Emma Lyford
Inventor
Frederick Wuest
By Geo. J. Murray
Atty

UNITED STATES PATENT OFFICE.

FREDERICK WUEST, OF LAWRENCEBURG, INDIANA, ASSIGNOR TO GEORGE H. BISHOP & CO., OF SAME PLACE.

TENON OR BACK SAW.

SPECIFICATION forming part of Letters Patent No. 607,107, dated July 12, 1898.

Application filed February 28, 1898. Serial No. 671,916. (No model.)

*To all whom it may concern:*

Be it known that I, FREDERICK WUEST, a citizen of the United States, and a resident of Lawrenceburg, in the county of Dearborn and State of Indiana, have invented certain new and useful Improvements in Tenon or Back Saws, of which the following is a specification.

My invention relates to tenon or back saws. Its object is to provide an adjustable back for the saw-blade, whereby the blade may be adjusted to any position desired in the back, so as to act as a gage for cutting gains or tenons of uniform depth of shoulder, the adjustable feature of the back also permitting the use of a blade having teeth upon its opposite edge either of the same or different size, so that the saw may be used longer without sharpening or may be used for coarser or finer work, as desired. These objects I attain by the means illustrated in the accompanying drawings, in which—

Figure 1 is a side elevation of a saw constructed according to my invention, the blade being adjusted to bring the cutting-teeth upon both sides of the back. Fig. 2 is an inside elevation of one side of the back, with the front connecting-bar in section. Fig. 3 is an inverted plan view of the saw shown in Fig. 1.

Referring to the parts, which are indicated by similar reference-letters wherever they occur throughout the various views, A is the handle, which may be of any approved construction, but preferably having the straight under edge, as shown, in practically the same plane as the lower edge of the back. This handle has a mortise back from its front edge, open at the lower side to receive the inner end of the back B, both sides of which are slotted at their inner ends to pass over a clamping-bolt C and a screw *d*, which pass transversely across the mortise, the bolt C being provided with a tail-nut *c* to clamp the back-bars firmly between the sides of the handle. The front or forward ends of the bars B B are united by a bar *b*, which is of the same gage as the saw-blade E and toothed upon the inside to engage the teeth *e* upon the end of the blade. These teeth or detents retain the forward end of the blade in any position set, while the rear end is clamped tightly by the tail-nut and bolt *c* and C.

To change the position of the blade in the back, it is only necessary to loosen the tail-nut, draw the bars B B slightly forward, so that the forward end of the saw may be disengaged from the detents in the connecting-bar *b*, then slide the saw-blade to the desired position with relation to the back or take it out and invert it, if desired, pushing the saw-blade forward until it engages with the detents, then press the bars B, with the saw between them, back to the position shown in Fig. 1 and tighten up the tail-nut. The back may of course be adjusted to the top edge of the blade, in which case the saw would be like the ordinary tenon-saws.

It is obvious that the teeth on the back or upper side of the saw may be omitted, if desired, if the back is only to be used as a gage for the depth of the tenon or gain to be cut.

What I claim as new, and desire to secure by Letters Patent, is—

1. In a tenon-saw the combination of the handle having its front end mortised or grooved, a guide-screw, a clamping screw and bolt crossing the mortise in the handle, the back consisting of two bars slotted at their inner ends to pass over the clamping and guide bolts in the handle and having its outer end united by a bar notched upon its inner edge, and the saw-blade having its end toothed to engage the notches in the uniting-bar of the back, substantially as shown and described.

2. The handle mortised or grooved at its forward end, having guide-screw and clamping-bolt crossing said mortise, the back slotted at its inner end to pass over the clamping-bolt and guide-screw and having its connected bar at the front end provided with teeth, and the saw-blade having teeth on both edges and end, substantially as shown and described.

FRED. WUEST.

Witnesses:
 WARREN TEBBS,
 FRANK NEHLS.